United States Patent
Tangudu et al.

(10) Patent No.: US 11,368,078 B2
(45) Date of Patent: Jun. 21, 2022

(54) ELECTRICAL MACHINE WINDING INDUCTANCE ENHANCEMENT

(71) Applicant: Carrier Corporation, Palm Beach Gardens, FL (US)

(72) Inventors: Jagadeesh Kumar Tangudu, South Windsor, CT (US); Parag M. Kshirsagar, South Windsor, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 379 days.

(21) Appl. No.: 16/603,958

(22) PCT Filed: Feb. 20, 2018

(86) PCT No.: PCT/US2018/018749
§ 371 (c)(1),
(2) Date: Oct. 9, 2019

(87) PCT Pub. No.: WO2018/190949
PCT Pub. Date: Oct. 18, 2018

(65) Prior Publication Data
US 2020/0119598 A1    Apr. 16, 2020

Related U.S. Application Data

(60) Provisional application No. 62/485,592, filed on Apr. 14, 2017.

(51) Int. Cl.
*H02K 29/03* (2006.01)
*H02K 1/02* (2006.01)
(Continued)

(52) U.S. Cl.
CPC ............... *H02K 29/03* (2013.01); *H02K 1/02* (2013.01); *H02K 1/16* (2013.01); *H02K 3/28* (2013.01); *H02K 11/014* (2020.08)

(58) Field of Classification Search
CPC ........ H02K 5/08; H02K 11/01; H02K 11/014; H02K 11/0141
See application file for complete search history.

(56) References Cited

U.S. PATENT DOCUMENTS

| 4,547,713 A | 10/1985 | Langley et al. |
| 6,069,431 A * | 5/2000 | Satoh ........................ H02K 1/02 310/256 |

(Continued)

FOREIGN PATENT DOCUMENTS

| CN | 1285950 A | 2/2001 |
| CN | 102594068 A | 7/2012 |

(Continued)

OTHER PUBLICATIONS

European Office Action dated Oct. 9, 2020 for European Patent Application No. 18708809.1.

(Continued)

*Primary Examiner* — Quyen P Leung
*Assistant Examiner* — Minki Chang
(74) *Attorney, Agent, or Firm* — Bachman & LaPointe, P.C.

(57) ABSTRACT

An electrical machine (20) has a stator (22) comprising: a core (50) having a first end (52) and a second end (54); one or more windings carried by the core and having: one or more first portions (62) protruding from the first end; and one or more second portions (64) protruding from the second end. A rotor (24) is mounted for rotation relative to the stator about an axis (500, 502). One or more chambers (70, 72) surround the one or more first portions and the one or more second portions. Ferromagnetic particles are in a fluid in the one or more chambers. The machine has means (80, 82, 104, 106) for varying a concentration of the ferromagnetic particles in the one or more chambers.

20 Claims, 3 Drawing Sheets

(51) Int. Cl.
  *H02K 1/16* (2006.01)
  *H02K 3/28* (2006.01)
  *H02K 11/01* (2016.01)

(56) References Cited

U.S. PATENT DOCUMENTS

| | | |
|---|---|---|
| 7,152,301 B2 | 12/2006 | Rittmeyer |
| 8,471,428 B2 | 6/2013 | Naganawa et al. |
| 8,525,374 B2 | 9/2013 | Mizukami et al. |
| 2004/0251768 A1 | 12/2004 | Nilson |
| 2007/0262658 A1 | 11/2007 | Drubel et al. |
| 2007/0278863 A1 | 12/2007 | Yamamoto et al. |
| 2010/0164303 A1* | 7/2010 | Veneruso ............ H02K 5/132 310/11 |
| 2013/0241343 A1* | 9/2013 | Browne ............... H02N 2/02 310/300 |

FOREIGN PATENT DOCUMENTS

| | | |
|---|---|---|
| CN | 104184224 A | 12/2014 |
| CN | 104285360 A | 1/2015 |
| CN | 205282210 U | 6/2016 |
| CN | 106150651 A | 11/2016 |
| DE | 102008049555 A1 | 4/2010 |
| GB | 2511082 B | 6/2016 |
| JP | 09149577 A | 6/1977 |
| JP | 62281751 A | 12/1987 |
| JP | 1051986 A | 2/1998 |
| WO | 89/00785 A1 | 1/1989 |

OTHER PUBLICATIONS

Chinese Office Action dated Jun. 25, 2021 for Chinese Patent Application No. 201880025023.4.

R. Ramakrishnan et al., "Real Time Estimation of Parameters for Controlling and Monitoring Permanent Magnet Synchronous Motors," May 2009, pp. 1194-1199, IEEE Int. Elect. Mach. Drives Conf., Miami, FL, IEEE, New York, New York.

EB-500 Series Data Sheet, Transystem, Inc., Kansas City, Missouri, Mar. 2009.

A. Spaggiari, "Properties and Applications of Magnetorheological Fluids", 2013, pp. 57-61, Frattura ed Integrità Strutturale, Cassino (FR), Italy.

H. Bae et al., "Implementation of Sensorless Vector Control for Super-High-Speed PMSM of Turbo-Compressor", May-Jun. 2003, pp. 811-818, vol. 39, Issue: 3, IEEE Transations on Ind Appln, IEEE, New York, New York.

Lord Technical Data, MRF-122EG Magneto-Rheological Fluid, Jul. 2008, Lord Corporation, Cary, North Carolina.

Jerome Cros, A New Structure of Universal, Motor Using Soft Magnetic Composites, Mar.-Apr. 2004, pp. 550-557, vol. 40, No. 2, IEEE Transactions on Industry Applications, IEEE, New York, New York.

International Search Report and Written Opinion dated May 22, 2018 for PCT/US2018/018749.

* cited by examiner

ELECTRICAL MACHINE WINDING INDUCTANCE ENHANCEMENT

CROSS-REFERENCE TO RELATED APPLICATION

Benefit is claimed of U.S. Patent Application No. 62/485,592, filed Apr. 14, 2017, and entitled "Electrical Machine Winding Inductance Enhancement", the disclosure of which is incorporated by reference herein in its entirety as if set forth at length.

BACKGROUND

The disclosure relates to electrical machines. More particularly, the disclosure relates to varying inductance at winding axial end portions of electrical machine stators.

Electrical machines include motors, alternators, generators, and the like. Exemplary electrical machines have a stator and a rotor mounted for rotation within the stator. The stator includes one or more windings which may include one or more coils of one or more strands or conductors of wire carried by a core of the stator. In the exemplary configurations, end portions of the windings protrude from opposite axial ends of the core. The particular winding layout varies greatly with the broad type of electrical machine (including whether single phase or poly phase) and particular design issues.

The stator core is typically formed as a laminated steel or iron stack. Similarly, the rotor typically comprises a steel or iron laminated stack. Depending upon the particular machine involved, the rotor or stator may also include permanent magnets and the rotor may also include its own winding(s) which may be in external electrical communication via a brush system or the like.

It is typically desired to have appropriate inductance to reduce current ripple. This may be achieved by an external filter or choke. For example, H. Bae, S. K. Sul, J. H. Kwon, J. S. Byeon, "*Implementation of Sensorless Vector Control for Super-High-Speed PMSM of Turbo-Compressor*", IEEE Transations on Ind Appln, Volume: 39, Issue: 3, May-June 2003, IEEE, New York, N.Y., the disclosure of which is incorporated by reference herein in its entirety as if set forth at length. Inductance estimation techniques are disclosed in Ramakrishnan, R., Islam, R., Islam, M., and Sebastian, T., 2009, *"Real Time Estimation of Parameters for Controlling and Monitoring Permanent Magnet Synchronous Motors,"* IEEE Int. Elect. Mach. Drives Conf., Miami, Fla., May, 2009, pp. 1194-1199, IEEE, New York, N.Y., the disclosure of which is incorporated by reference herein in its entirety as if set forth at length.

Further examples of inductance increasing mechanisms have been proposed, for example, in U.S. Pat. No. 6,069,431 of Sato et al., May 30, 2000, the disclosure of which is incorporated by reference herein in its entirety as if set forth at length. U.S. '431 specifically discloses a generator. In one embodiment, U.S. '431 encapsulates winding end portions in a mixture of ferrite powder and a thermosetting resin. The mixture extends around and through the looped end portions to increase inductance.

SUMMARY

One aspect of the disclosure involves an electrical machine comprising a stator comprising: a core having a first end and a second end; one or more windings carried by the core and having: one or more first portions protruding from the first end; and one or more second portions protruding from the second end. A rotor is mounted for rotation relative to the stator about an axis. One or more chambers surround the one or more first portions and the one or more second portions. Ferromagnetic particles are in a fluid in the one or more chambers. The machine has means for varying a concentration of the ferromagnetic particles in the one or more chambers.

In one or more embodiments of any of the foregoing embodiments, the means comprises: a flowpath extending from an outlet of the one or more chambers and returning to an inlet of the one or more chambers; at least one pump along the flowpath; and a separator along the flowpath.

In one or more embodiments of any of the foregoing embodiments, the separator is a gravity separator.

In one or more embodiments of any of the foregoing embodiments, the means comprises: a first branch of the flowpath between the separator and the inlet; and a second branch of the flowpath between the separator and the inlet, the second branch positioned to preferentially draw said ferromagnetic particles from the separator relative to the first branch.

In one or more embodiments of any of the foregoing embodiments, the means comprises one or more controlled valves positioned for apportioning flow between the first branch and the second branch.

In one or more embodiments of any of the foregoing embodiments, the one or more controlled valves comprise a first valve for controlling flow along the first branch and a second valve for controlling flow along the second branch.

In one or more embodiments of any of the foregoing embodiments, the fluid comprises an oil.

In one or more embodiments of any of the foregoing embodiments, the fluid comprises a primary fluid and a surfactant.

In one or more embodiments of any of the foregoing embodiments, the core comprises a laminate.

In one or more embodiments of any of the foregoing embodiments, the ferromagnetic particles comprise carbonyl iron.

In one or more embodiments of any of the foregoing embodiments, the ferromagnetic particles have characteristic size up to 20 μm.

In one or more embodiments of any of the foregoing embodiments, the one or more chambers comprise: a first annular chamber at the first end; and a second annular chamber at the second end.

In one or more embodiments of any of the foregoing embodiments, the electrical machine is a motor.

In one or more embodiments of any of the foregoing embodiments, a controller is configured to: control the concentration of the ferromagnetic particles in the fluid in the one or more chambers so as to limit input current ripple to the electrical machine.

In one or more embodiments of any of the foregoing embodiments, the control of the concentration comprises apportioning return flow to the one or more chambers between a flow from a particle-rich region of a separator and a flow from a particle-poor region of the separator.

In one or more embodiments of any of the foregoing embodiments, the control of the concentration comprises: an iterative calculation of an estimated inductance ($\hat{L}$) of the motor using a model of the motor using said estimated inductance.

In one or more embodiments of any of the foregoing embodiments, the control of the concentration comprises:

calculating a required inductance (L*); and controlling to reduce a difference between said required inductance and said estimated inductance.

In one or more embodiments of any of the foregoing embodiments, a method for using the electrical machine comprises controlling the concentration of the ferromagnetic particles in the fluid in the one or more chambers so as to limit input current ripple to the electrical machine.

In one or more embodiments of any of the foregoing embodiments, the method further comprises the concentration of the ferromagnetic particles in the fluid in the one or more chambers being varied from a low of 20% or less by volume to a high of at least 30% by volume.

In one or more embodiments of any of the foregoing embodiments, the concentration of the ferromagnetic particles in the fluid in the one or more chambers is varied from a low of 10% or less by volume to a high of at least 30% by volume.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
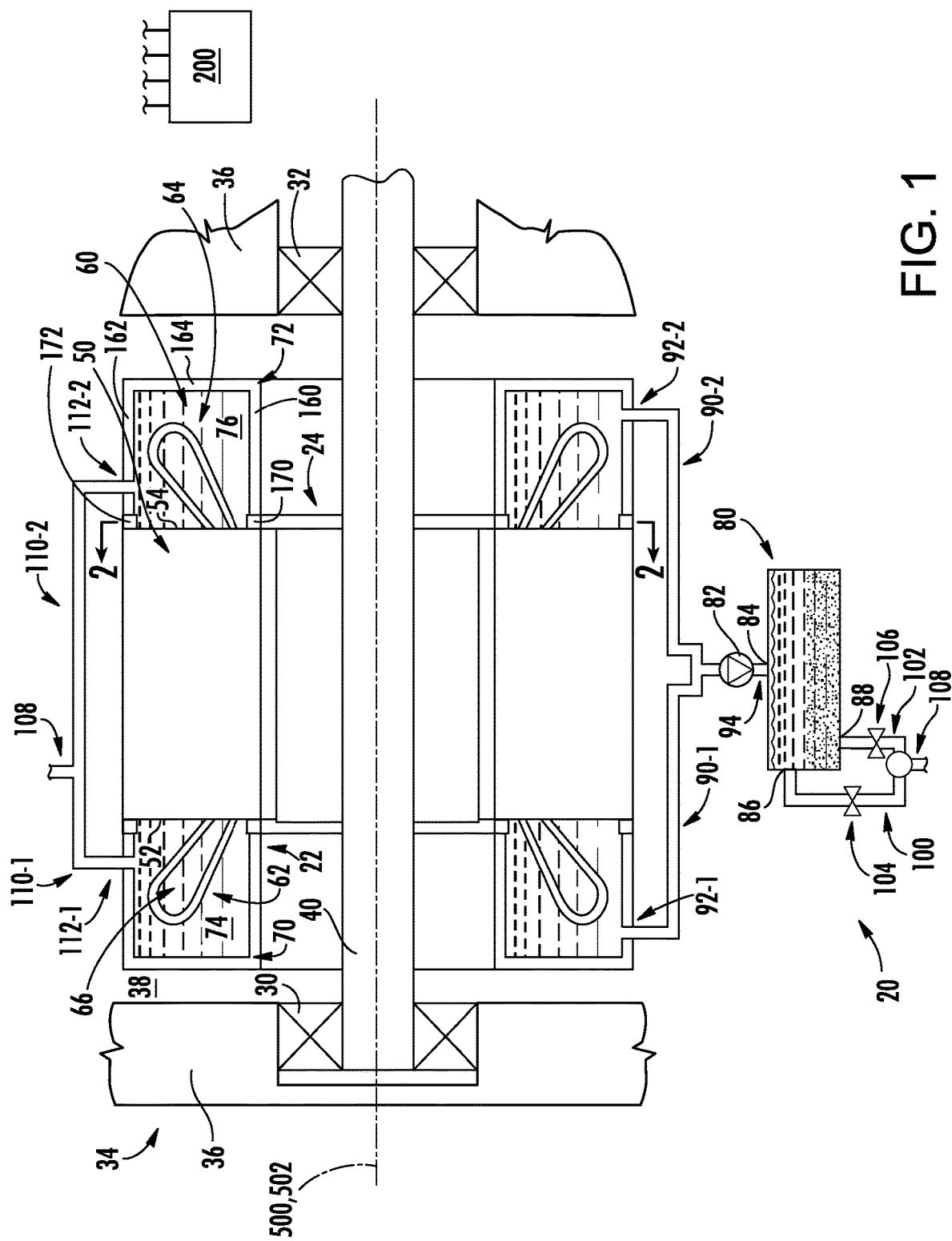
FIG. 1 is a central longitudinal view of a compressor motor.

FIG. 1 shows an electrical machine 20 having a stator 22 and a rotor 24. The stator has a central longitudinal axis 500. The rotor has a central longitudinal axis 502. The axes 500 and 502 are essentially coincident and form an axis of rotation of the rotor relative to the stator (subject to manufacturing tolerances, wear, vibration, and the like).

The rotor may be mounted to rotate about the axis 500, 502 by one or more bearings 30, 32 to maintain the axes essentially coincident. Depending upon implementation, the bearings 30, 32 may directly or indirectly support the rotor relative to the stator. The exemplary embodiment of an electrical machine 20 is as a motor in a compressor 34 having a housing or case 36 including a motor compartment 38 in which the stator is mounted to the case. Thus, the exemplary bearings 30 and 32 mount a shaft 40 of the compressor directly to the case and thus indirectly to the stator. The rotor 24 is mounted to the shaft (e.g., via a press fit, keyed interfitting, threaded interaction, or the like).

Figure 2:
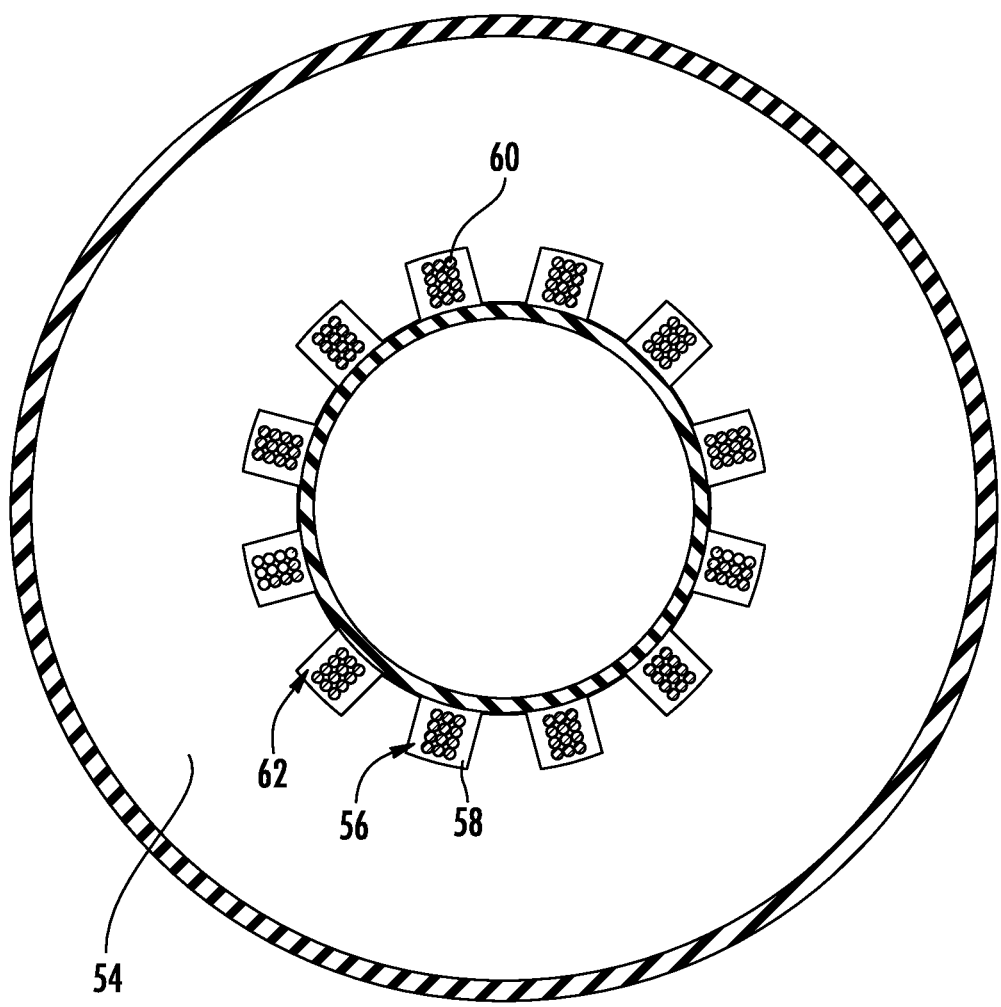
FIG. 2 is a cutaway view of a stator of the motor, taken along line 2-2 of FIG. 1.

The stator comprises a core 50. The exemplary core is formed as a laminate stack extending from a first end 52 to a second end 54. The core has apertures or slots 56 (FIG. 2) through which one or more windings 60 pass. The slots are filled with an encapsulant 58 (FIG. 2) such as resins (e.g., epoxies) and organic varnishes (e.g., Remisol EB549 waterborne bonding varnish of Rembrandtin Lack GmbH Nfg. KG, Vienna, Austria). The particular encapsulant may be selected for a desired combination of properties such as adhesion, low moisture permeability, corrosion resistance, and mechanical integrity. Other exemplary encapsulants include those disclosed in U.S. Patent Application Publication 2011/0160359A1 of Kempe et al., published Jun. 30, 2011.

The windings 60 have a plurality of first end portions 62 protruding from the first end 52 and a plurality of second end portions 64 protruding from the second end 54. Each of the end portions is formed by a plurality of strands or individual wires in a loop having an open interior 66. The rotor may be of appropriate type for the machine and may typically comprise an axial lamination stack and permanent magnets forming a conventional permanent magnet motor. Among other variations, the rotor may include permanent rotor coils (e.g., in a non-permanent magnet rotor).

Additional well-known/ubiquitous features are not shown. As is so far described, the motor is broadly representative of one or more types of electrical machines. However, to increase inductance, one or more chambers are provided to surround the end portions 62 and 64 to contain a mixture of ferromagnetic particles in a fluid so as to immerse the end portions in the mixture and increase inductance. Additionally, means may be provided for varying a concentration of the ferromagnetic particles in the one or more chambers. Such means may allow on-the-fly control of inductance to accommodate operational conditions.

In the illustrated example, a single first end chamber 70 and single second end chamber 72 have respective interiors 74 and 76. The exemplary chambers 70 and 72 are thus full annular containing a plurality of separated end portions of the winding(s). Each chamber comprises an inner wall 160, an outer wall 162, and an end wall 164. The rim of the inner wall seals to the associated core end via a seal such as an O-ring 170. The O-ring also seals with the encapsulant 58 at the slots. Similarly, the rim of the outer wall seals to the associated core end via a seal such as an O-ring 172.

The means for varying the concentration comprises a separator 80 along a flowpath from the chambers and returning to the chambers. A pump 82 is located along the flowpath to drive a flow. The exemplary separator 80 is a gravity separator that also serves as a reservoir for fluid (e.g., oil) and the ferromagnetic particles. This is achieved by density stratification with the particles settling at the bottom of the separator. The separator thus has an inlet 84, a first outlet 86, and a second outlet 88. The exemplary first outlet is higher on the separator vessel than the second outlet 88. Thus, the second outlet is positioned to preferentially draw the ferromagnetic particles relative to the oil whereas the first outlet is positioned to preferentially draw oil.

The exemplary flowpath is a branching flowpath starting with two parallel respective branches 90-1 and 90-2 extending from respective chamber outlets 92-1 and 92-2. The two branches merge upstream of the exemplary pump 82 as a single flowpath 94 to the separator inlet 84. The flowpath again splits at the separator with a leg or branch 100 from the first outlet 86 and a leg or branch 102 from the second outlet 88. Respective valves 104 and 106 are positioned to control respective flows along the legs 100 and 102. Alternatively, a single three-way valve or a proportioning valve may be used. The legs 100 and 102 again merge into a single flowpath leg 108 which, in turn, splits into respective return flowpath legs or branches 110-1 and 110-2 to respective return ports or inlets 112-1 and 112-2. The system is schematically shown. For improved particle flow and to insure priming of the pump, the pump may be positioned low (e.g., below the stator) and the reservoir positioned high (e.g., above the stator).

The valve(s) and pump may be controlled by a system controller 200. For example, when the control logic determines a need to increase inductance, the valve 106 may be opened and the valve 104 may be closed and the pump runs to deliver particle-rich fluid to the chambers while withdrawing fluid having relatively less particles. This process may continue until the desired inductance is achieved.

Similarly, when the logic indicates a desired inductance reduction, the controller may open (or keep open) the valve 104 and close (or keep closed) the valve 106 and run the pump to introduce relatively particle-lean or depleted fluid to the chambers while withdrawing relatively particle rich fluid from the chambers.

The fluid-particle system may be the same as or otherwise resemble magnetorheological fluids used in damping applications. Such existing magnetorheological fluids typically are a non-colloidal mixture of ferromagnetic particles randomly dispersed in a carrier fluid such as oil or water, plus surfactant to avoid the settling of the suspended particles.

Exemplary particles are carbonyl iron. Other materials may include other ferrous particles. Particle material, size, and morphology may be selected for ability to be entrained/suspended in the oil or other carrier, ability to be pumped by the particular pump without damaging the pump. Exemplary characteristic particle size is 0.1-20.0 µm, more particularly 3.0-20.0 µm or 3.0-10.0 µm. Exemplary morphology is essentially spherical.

Exemplary oil is synthetic oil. Alternative oils include mineral oil. Liquid carriers other than oil may be used. Such carriers may include water or aqueous solution, glycol, or even the refrigerant in a vapor compression system. Desirable properties include ability to suspend and carry the particles.

Exemplary surfactants include oleic acid, tetramethylammonium hydroxide, citric acid, and soy lecithin.

The quantity of particles available may be sufficient to provide a desired control over inductance. For example, this may result in the ability to increase inductance by at least 5% over the minimum inductance or at least 10%. Typically, ability to increase by more than 50% would not be needed. As is discussed below, a control method may make use of whatever capacity to control inductance is provided.

With increase in particle concentration (for example increasing from a low around from 5% by volume to a high of at least 40% by volume) magnetic permeability of the fluid substantially increases and thereby provides higher permeance path for the leakage flux in the end winding region, thereby increasing leakage inductance in the end winding 62, 64. Similarly, with lower particle concentration magnetic permeability reduces and therefore lowers inductance. Operational swings of the concentration in the chambers may include lows of 20% or less by volume, more particularly 10% or less, and highs of at least 30%, more particularly, at least 40% and up to an exemplary 60%. Thus, deltas in concentration may be at least 10% or at least 20% or at least 30%.

The controller 200 may further receive user inputs from an input device (e.g., switches, keyboard, or the like) and sensors (not shown, e.g., pressure sensors and temperature sensors at various system locations). The controller may be coupled to the sensors and controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

The electrical machine and its components may be made using otherwise conventional or yet-developed materials and techniques.

Figure 3:
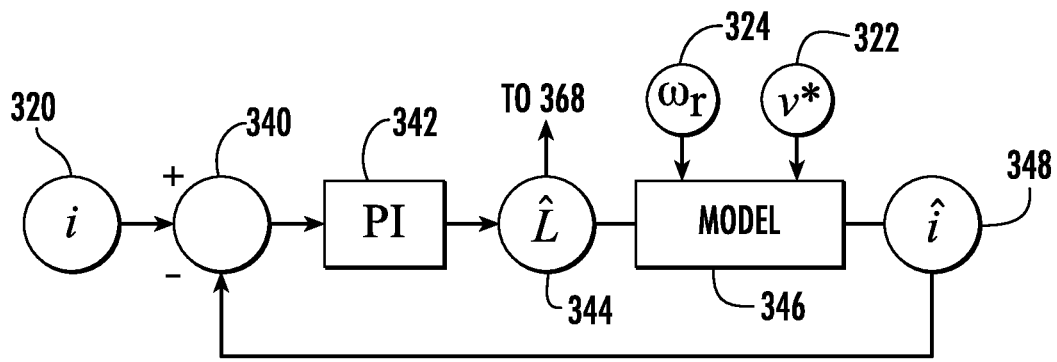
FIG. 3 is a first portion of a control routine.
Figure 4:
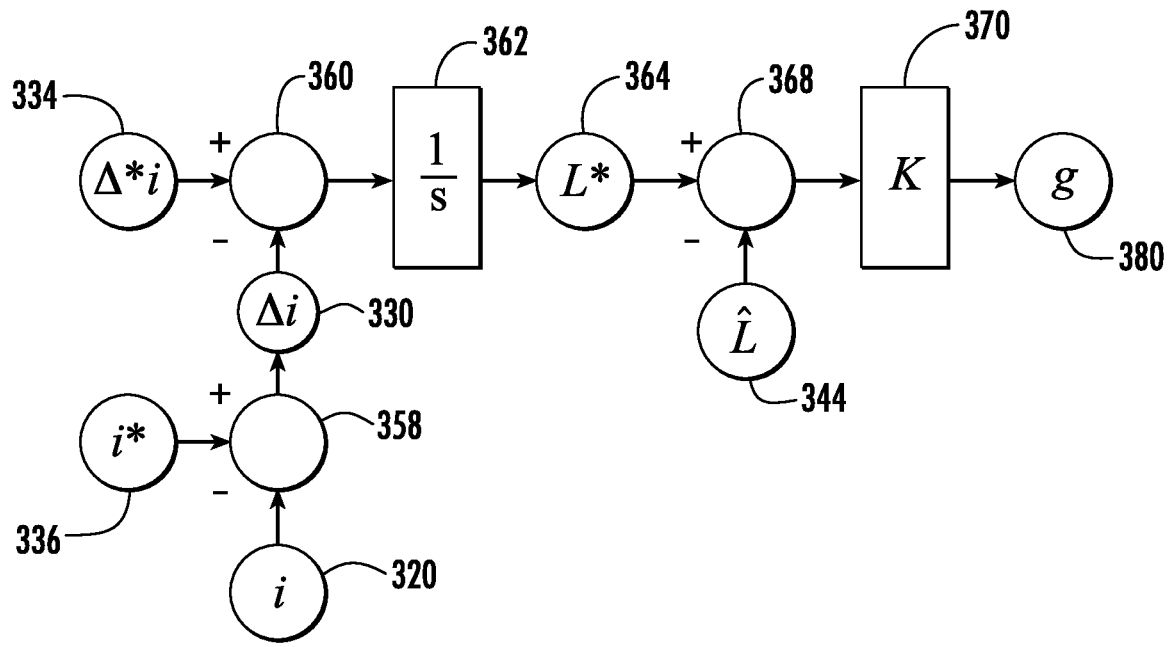
FIG. 4 is a second portion of the control routine.

FIGS. 3 and 4 show a control routine which may be programmed or otherwise configured into the controller. The routine provides for inductance control and may be superimposed upon the controller's normal programming/routines (not shown, e.g., providing the basic operation of a baseline system to which the foregoing control routine is added). In a specific control example, the baseline controller controls a power supply to power the motor. The controller receives a conventional spectrum of inputs including motor current i (cell 320 in FIG. 4) from a motor current sensor (not shown). The controller outputs to the power supply the reference voltage v* (cell 322 in FIG. 3) and the motor speed or frequency $\omega_r$ (cell 324 in FIG. 3). These are used to add control of the particle concentration in the chambers to the programming of the controller.

As noted above, when it is desired to increase inductance, the pump is run and at least the second valve 106 opened to deliver particle-rich fluid from the second outlet 88. When it is desired to reduce inductance, the pump is run and the first valve 104 opened to deliver oil-rich fluid from the first outlet 86. Numerous particular control possibilities exist. These include binary valves where only one valve is open at a time; variable valves where only one valve is open at a time; variable valves where both valves are open at a time (e.g., varied opposite each other). In the last example, the controller may be configured to calculate a parameter reflective of the desired inductance change and may then control the pump and valves (e.g., a value from −1 to 1 where −1 maximally opens the first valve and closes the second valve and 1 maximally opens the second valve and closes the first valve). Another example involves increasing inductance by having the second valve 106 fully open while having the first valve 104 open to a degree in inverse relation to the desired inductance increase. Another example involves increasing inductance by having the second valve 106 fully open while having the first valve 104 partially open to a single predetermined degree to cause mixing and flow to improve flow (e.g., if flow from the second valve alone would be too viscous/thick).

The example below uses the inductance control to limit or reduce a motor current ripple $\Delta i$ (cell 330 in FIG. 4). In the example, the controller is pre-programmed with a desired or target current ripple $\Delta^* i$ (cell 334 in FIG. 4). When the motor's machine (e.g., compressor) is set up, the target current ripple is entered based on an estimate of what can be achieved based on the motor configuration, anticipated operational conditions, and the capacity of the inductance control means (e.g. reflecting the concentration of particulates, among other factors). Exemplary target current ripple values are in the range of 2% to 10%, more particularly 3% to 6%.

In the example, the parameter g (cell 380 in FIG. 4) is the calculated parameter indicating whether to increase or decrease inductance. Working backward, this is determined by subtracting (cell 368 in FIG. 4) an estimated inductance $\hat{L}$ (cell 344 in FIGS. 3 and 4) from a required inductance L* (cell 364 in FIG. 4) and applying a proportional controller gain K (cell 370 in FIG. 4). The derivation of $\hat{L}$ and L* is discussed below.

L* (cell 364) is derived from desired current ripple $\Delta^* i$ and measured current ripple $\Delta i$ by subtracting (cell 360) and integrating (cell 362). Measured current ripple $\Delta i$ is derived by subtracting (cell 358) measured motor current i from a reference motor current i* (cell 336). Reference motor current is a parameter used in the baseline controller to control a drive of the motor and is a traditional input used in classical control techniques of a motor, such as, vector control, direct torque control or volt/hertz control.

The estimated inductance $\hat{L}$ is iteratively calculated by using a model (cell 346 of FIG. 3) to calculate an estimated motor current $\hat{i}$ (cell 348 of FIG. 3) and comparing (cell 340 of FIG. 3) that estimated current to measured current i. The exemplary model is:

$$(v^* - \omega_r \lambda_m)/(s\,\hat{L}+r) = \hat{i}$$

where: v* is the reference voltage, $\omega_r$ is the motor velocity, $\lambda_m$ is the peak permanent magnet flux linkage amplitude, r is the motor resistance.

Successive $\hat{L}$ values are determined by applying a proportional integral (PI) regulator (cell 342 of FIG. 3) to the current difference. PI=kp+ki/s. P represents kp (controller gain); I represents ki/s (where i is integrator gain). In some cases ki=1 (then I=1/s).

Thus, the error between the measured current and estimated current is proportional to the synchronous inductance of the motor. This error is minimized using a proportional integral controller. The resulting output of the PI regulator is the estimated inductance. This inductance is assumed to be linear within the operating range of the motor. The estimated inductance then is used to estimate the current using the estimated motor model.

The inductance of the motor is calculated based on the desired current ripple in the stator phase currents. The desired current ripple is typically below 5% of the nominal current peak amplitude. The current ripple is measured by taking the difference of the measured motor phase current from the reference motor current. The error between the desired current ripple and the measured current ripple is integrated (denoted as 1/s in Laplace domain) until the error is minimized. The resulting output of the integration is the required motor inductance. Then the error between the required motor inductance and the estimated inductance is minimized using a proportional controller of gain K. The output of the proportional controller is g which generates an output signal that directly controls the flow of oil through the valves.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. An electrical machine (20) comprising:
    a stator (22) comprising:
        a core (50) having a first end (52) and a second end (54);
        one or more windings carried by the core and having:
            one or more first portions (62) protruding from the first end; and
            one or more second portions (64) protruding from the second end;
    a rotor (24) mounted for rotation relative to the stator about an axis (500, 502);
    one or more chambers (70, 72) surrounding the one or more first portions and the one or more second portions;
    ferromagnetic particles in a fluid in the one or more chambers; and
    means (80, 82, 104, 106) for varying a concentration of the ferromagnetic particles in the one or more chambers, the means comprising:
        a flowpath extending from an outlet (92-1, 92-2) of the one or more chambers and returning to an inlet (112-1, 112-2) of the one ore more chambers;
        at least one pump (82) along the flowpath; and
        a separator (80) along the flowpath.

2. The electrical machine of claim 1 further comprising:
    a controller (200) configured to control the concentration of the ferromagnetic particles in the fluid in the one or more chambers so as to limit input current ripple to the electrical machine.

3. The electrical machine of claim 1 wherein:
    the separator is a gravity separator.

4. The electrical machine of claim 1 wherein the means comprises:
    a first branch (100) of the flowpath between the separator and the inlet; and
    a second branch (102) of the flowpath between the separator and the inlet, the second branch positioned to preferentially draw said ferromagnetic particles from the separator relative to the first branch.

5. The electrical machine of claim 4 wherein the means comprises:
    one or more controlled valves (104, 106) positioned for apportioning flow between the first branch and the second branch.

6. The electrical machine of claim 5 wherein:
    the one or more controlled valves comprise a first valve for controlling flow along the first branch and a second valve for controlling flow along the second branch.

7. The electrical machine of claim 1 wherein:
    the fluid comprises an oil.

8. The electrical machine of claim 1 wherein:
    the fluid comprises a primary fluid and a surfactant.

9. The electrical machine of claim 1 wherein:
    the core comprises a laminate.

10. The electrical machine of claim 1 wherein:
    the ferromagnetic particles comprise carbonyl iron.

11. The electrical machine of claim 1 wherein:
    the ferromagnetic particles have characteristic size up to 20 μm.

12. The electrical machine of claim 1 wherein:
    the one or more chambers comprise:
        a first annular chamber (70) at the first end; and
        a second annular chamber (72) at the second end.

13. The electrical machine of claim 1 being a motor.

14. An electrical machine (20) comprising:
    a stator (22) comprising:
        a core (50) having a first end (52) and a second end (54);
        one or more windings carried by the core and having:
            one ore more first portions (62) protruding from the first end; and
            one or more second portions (64) protruding from the second end;
    a rotor (24) mounted for rotation relative to the stator about an axis (500, 502);
    one or more chambers (70, 72) surrounding the one ore more first portions and the one or more second portions;

ferromagnetic particles in a fluid in the one or more chambers; and a controller (200) configured to control the concentration of the ferromagnetic particles in the fluid in the one or more chambers so as to limit input current ripple to the electrical machine.

15. The electrical machine of claim 14 wherein:

the control of the concentration comprises apportioning return flow to the one or more chambers between a flow from a particle-rich region of a separator and a flow from a particle-poor region of the separator.

16. The electrical machine of claim 15 wherein the control of the concentration comprises:

calculating a required inductance (L*); and controlling to reduce a difference between said required inductance and said estimated inductance.

17. The electrical machine of claim 14 wherein the control of the concentration comprises:

an iterative calculation of an estimated inductance ($\hat{L}$) of the motor using a model of the motor using said estimated inductance.

18. A method for using an electrical machine (20), the electrical machine comprising:

a stator (22) comprising:

a core (50) having a first end (52) and a second end (54);

one or more windings carried by the core and having:

one ore more first portions (62) protruding from the first end; and one or more second portions (64) protruding from the second end;

a rotor (24) mounted for rotation relative to the stator about an axis (500, 502);

one or more chambers (70, 72) surrounding the one ore more first portions and the one or more second portions; and ferromagnetic particles in a fluid in the one or more chambers, the method comprising:

controlling the concentration of the ferromagnetic particles in the fluid in the one or more chambers so as to limit input current ripple to the electrical machine.

19. The method of claim 18 further comprising:

the concentration of the ferromagnetic particles in the fluid in the one or more chambers is varied from a low of 20% or less by volume to a high of at least 30% by volume.

20. The method of claim 18 wherein:

the concentration of the ferromagnetic particles in the fluid in the one or more chambers is varied from a low of 10% or less by volume to a high of at least 30% by volume.

\* \* \* \* \*